United States Patent
Cook

(10) Patent No.: US 10,425,558 B2
(45) Date of Patent: Sep. 24, 2019

(54) METHODS AND SYSTEMS FOR PROCESSING DOCUMENTS USING MULTIPLE HALFTONE SCREENING TECHNIQUES

(71) Applicant: Global Graphics Software Limited, Cambridge (GB)

(72) Inventor: Daniel J. Cook, Cambridge (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 0 days.

(21) Appl. No.: 15/829,681

(22) Filed: Dec. 1, 2017

(65) Prior Publication Data
US 2018/0160011 A1 Jun. 7, 2018

Related U.S. Application Data

(60) Provisional application No. 62/429,642, filed on Dec. 2, 2016.

(51) Int. Cl.
*H04N 1/405* (2006.01)
*H04N 1/40* (2006.01)
*G06K 15/02* (2006.01)

(52) U.S. Cl.
CPC ........ *H04N 1/4052* (2013.01); *G06K 15/1881* (2013.01); *H04N 1/4057* (2013.01); *H04N 1/40062* (2013.01); *H04N 2201/0082* (2013.01)

(58) Field of Classification Search
CPC ..... H04N 1/405–1/4055; B41J 2/04593; B41J 2/205; B41J 2/2054; B41J 2/2121; B41J 2/2132; G06K 15/1881
See application file for complete search history.

(56) References Cited

U.S. PATENT DOCUMENTS

| | | | | |
|---|---|---|---|---|
| 5,917,614 A | * | 6/1999 | Levien | H04N 1/4053 358/3.03 |
| 6,906,825 B1 | * | 6/2005 | Nakahara | H04N 1/4051 358/1.9 |
| 2008/0259361 A1 | * | 10/2008 | Kakutani | G06K 15/107 358/1.8 |

OTHER PUBLICATIONS

PostScript Language Reference, Third Edition; Adobe Systems Incorporated; 1985-1999; Table of Contents and pp. 480-501.
Adobe PostScript 3; Halftones and Screens; Adobe Systems Incorporated; Oct. 9, 1997; pp. iii-xii, 13-26.
https://en.wikipedia.org/wiki/Error_diffusion, 5 pages.

* cited by examiner

*Primary Examiner* — Scott A Rogers
(74) *Attorney, Agent, or Firm* — Lowe Graham Jones PLLC; Bruce E. Black

(57) ABSTRACT

A method of processing a document for printing includes receiving a document; for at least one of the plurality of regions, determining a drop size for that region and determining whether the drop size for printing the region meets a threshold criterion and, if so, processing the region using a tile-based screen for halftoning and, if not, processing the region using an error diffusion screen for halftoning; and printing the processed regions. Another method includes additionally considering coverage level to determine whether to use a tile-based screen or error diffusion screen. Yet another method includes determining whether the region is within a threshold range of a drop step change.

20 Claims, 4 Drawing Sheets

METHODS AND SYSTEMS FOR PROCESSING DOCUMENTS USING MULTIPLE HALFTONE SCREENING TECHNIQUES

CROSS-REFERENCE TO RELATED APPLICATIONS

This application claims the benefit under 35 U.S.C. § 119(e) of U.S. Provisional Patent Application Ser. No. 62/429,642, filed Dec. 2, 2016, which is incorporated herein by reference.

FIELD

The present invention is directed to the area of document processing and printing. The present invention is also directed to methods and systems for halftoning graphical elements in a document.

BACKGROUND

Halftoning is a process by which continuous-tone imagery are approximated on an output device (e.g., printing device) through the use of drops or dots that may vary in size, spacing, or both. The tiny halftone dots are blended into smooth tomes by the human eye. Halftoning can also be used to provide continuous-tone colors using only a limited number of discrete colors. Colors that the device cannot produce directly are simulated by using patterns of pixels in the colors available. One familiar example of halftone is the rendering of gray tones with black and white pixels, as in a newspaper photograph.

Halftoning is commonly practiced using a screening function to select the size or position of the halftone dots. Examples of screening functions are spot-function based screens, tile-based screens (such as threshold screens), or algorithmic screens (such as error diffusion screens.)

BRIEF SUMMARY

One embodiment is a method of processing a document for printing that includes receiving a document; for each of a plurality of regions of the document, determining a drop size for printing the region, and determining whether the drop size for printing the region meets a threshold criterion and, if so, processing the region using a tile-based screen for halftoning and, if not, processing the region using an error diffusion screen for halftoning; and printing the processed regions.

In at least some embodiments, the threshold criterion is that the drop size is not the smallest drop size. In at least some embodiments, the threshold criterion is that the drop size is not one of the smallest two drop sizes. In at least some embodiments, the threshold criterion is that the drop size is not one of one or more specified drop sizes, wherein the one or more specified drop sizes do not include the smallest drop size.

Another embodiment is a method of processing a document for printing that includes receiving a document; for each of a plurality of regions of the document, determining a drop size for printing the region, and determining whether the drop size for printing the region meets a first threshold criterion and, if so, processing the region using a tile-based screen for halftoning, otherwise determining whether a coverage level for printing the region meets a second threshold criterion and, if so, processing the region using a tile-based screen for halftoning and, if not, processing the region using an error diffusion screen for halftoning; and printing the processed regions.

In at least some embodiments, the first threshold criterion is that the drop size is not the smallest drop size. In at least some embodiments, the second threshold criterion is that the coverage level is at or above a threshold coverage level.

Yet another embodiment is a method of processing a document for printing that includes receiving a document; for each of a plurality of regions of the document, determining whether the region is within a threshold range of a drop step change and, if so, processing the region using a tile-based screen for halftoning and, if not, processing the region using an error diffusion screen for halftoning; and printing the processed regions.

In at least some embodiments, the threshold range is a physical distance on the media or a number of pixels.

In at least some embodiments of any of the methods described above, the tile-based screen is a threshold screen. In at least some embodiments, the threshold screen utilizes at least one lookup array of threshold values.

A further embodiment is a system for processing a document for printing. The system includes at least one processor configured and arranged to perform one or more of the methods described above. The system optionally includes a printing device. In at least some embodiments, the one or more processors may be part of the printing device.

Another embodiment is a non-transitory computer-readable medium having processor-executable instructions for processing documents, the processor-executable instructions when installed onto a device enable the device to perform one or more of the methods described above.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for halftoning graphical elements in a document.

When halftoning a graphical element or document, a single screen is typically used for the graphical element or document or an entire job and may be selected based on the equipment used, the printer, source document, or other factors. As disclosed herein, methods and systems can use two or more different types of screens to halftone a graphical element, image, or document.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
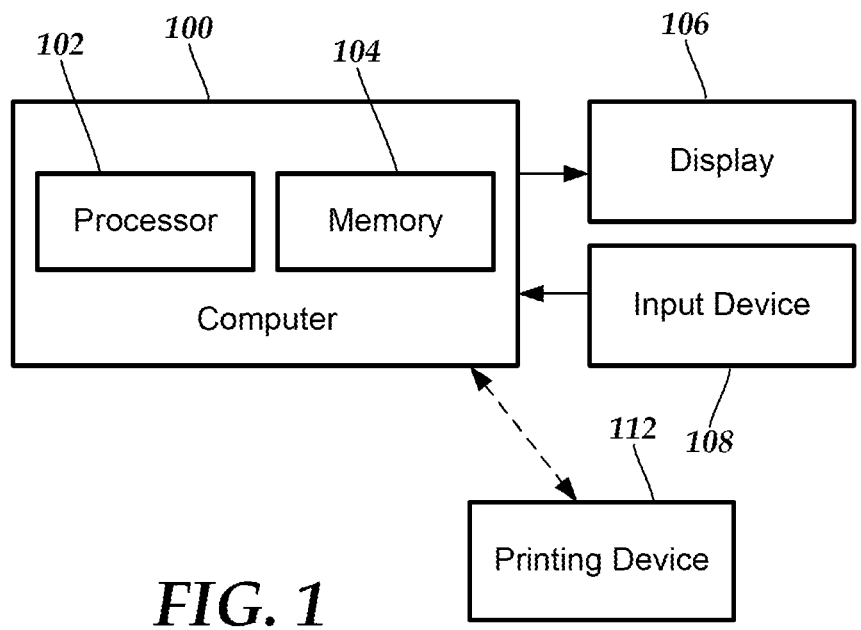
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be an inkjet device, an electrophotographic (e.g., toner) device, or any other suitable device. In some embodiments, one or more of the computer 100, display 106, or input device 108 can be part of the printing device 112.

The computer 100 can be a laptop computer, desktop computer, server computer, tablet, mobile device, smartphone or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 102. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Figure 2:
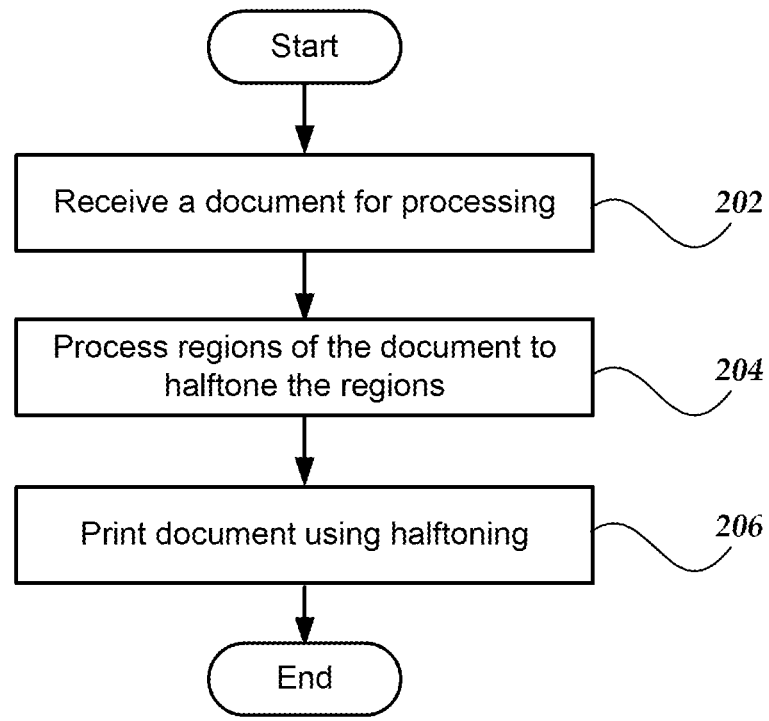
FIG. 2 is a schematic flowchart of one embodiment of a method of processing a document, according to the invention.

FIG. 2 is a flow chart of one method of processing a printing a document. The term "document", as used herein, includes, but is not limited to, text, graphics, images, or other graphical elements or any combination thereof. A "document" can be single page or multi-page or may represent only part of a page or may not be paginated at all.

In step 202, the document is received for processing. The document may be received from another source or may be developed (or partially developed) on the computer 100.

In step 204, the document is processed to halftone the document for printing. This can be accomplished by processing individual regions of the document to halftone the regions. In at least some embodiments, each region corresponds to a single pixel so that the processing proceeds pixel-by-pixel. In other embodiments, at least some of the regions (or all of the regions) include multiple pixels or other divisions of the document. For example, the document can be divided into regions where each region includes one or more graphical elements such as, for example, an image, a portion of an image, a region of text, or any other graphical element. As described below, there are a variety of techniques for halftoning the document or regions of the document.

In step 206, the document is printed using halftoning. The document may be printed using a device that also performed steps 202 and 204 or the processed document may be delivered to a printing device for printing.

Some digital print devices may use a single colorant (for example, black) or multiple colorants (for example, black, yellow, cyan, and magenta and, optionally, other colorants). A digital print device can lay down different amounts of colorant at each addressable location on the media. This ability is common for digital inkjet printing devices and electrophotographic (EP, toner) printers. For inkjet devices, for instance, any of the following may be used: (1) The print head moves across the media multiple times, emitting ink drops on every pass. Each location on the media may receive zero, one, or more drops. (2) The media moves beneath a 'grayscale' print head, where each nozzle is capable of delivering a variety of different drop sizes on demand. (3) The media moves beneath a series of print heads, each nozzle of which can emit a single drop size, but each addressable location on the media may have a drop placed by zero, one, or more heads. (4) The media moves below a series of print heads, which contain nozzles, each of which can deliver a single drop size, but where different nozzles can emit different drop sizes. This list is not intended to be exhaustive.

The amounts of colorant that can be applied in any location on the media form discrete steps. A RIP (raster image processor) or screening engine determines the droplet size and distribution of drops using a screening function.

There are a variety of screen techniques and screening functions including, but not limited to, spot-function based screens, tile-based screens (such as threshold screens), or algorithmic screens (such as error diffusion screens.)

The systems and methods described herein combine two or more screening techniques to process graphical elements. The systems and methods will be discussed below, using, as an example, a combination of error diffusion screens (EDS) and tile-based screens together in a single document, image, or other graphical object. In some instances, EDS better reproduces portions of the document, image, or other graphical object while tile-based screens are better for other portions of the document, image, or other graphical object. It will be understood that other combination of screen techniques and screening functions can be used.

There are a variety of error diffusion screen techniques. In general, however, the EDS techniques consider each pixel individually and determine whether a drop (and, optionally, the size of the drop) is to be placed at that position or not. This process reduces the number of different possible levels of colorant to two or more discrete levels. Generally, this determination for a pixel produces some error with respect to the original value. For example, in one embodiment, the pixel may be compared to half-gray value. If it is above that value, a white pixel is generated in the processed image. If it is below that value a black pixel is generated in the processed image. The difference between the half-gray value and the full-white value or full-black value for that pixel is the resulting error. In EDS techniques, the error is distributed to one or more neighboring pixels (typically, pixels that have not yet been processed). Any suitable EDS technique can be used in the methods and systems described herein including, but not limited to, one or two dimensional EDS techniques.

Error diffusion screening is often capable of producing very smooth results for graphics that do not include any high contrast edges. On the other hand, error diffusion screening can be more computationally expensive to apply than a tile-based or spot-function screening, meaning that error diffusion screening may be slow for high-volume digital presses. In at least some instances, error diffusion screening may also reduce or damage fine detail in the vicinity of high-contrast edges.

Tile-based screens include screening approaches based on looking up results in one or more arrays of values. The following are non-limiting examples of tile-based screens. For example, tile-based screens include threshold array screens, such as those described in Postscript® Language Reference, third edition, Adobe Systems Incorporated (including, for example, halftone types 3 and 6 in Chapter 7) or ISO 32000-1:2008, "Document management—Portable document format—Part 1: PDF 1.7", both of which are incorporated herein by reference. In at least some embodiments of these threshold array screens, one or two arrays of threshold values are provided. If the tone value to be rendered in the area of an output pixel is lower than that of the table value associated with the position of that pixel on the output then the pixel is marked for printing with the colorant, otherwise it is not.

Another example of tile-based screens is an extension of the threshold array model, described above, for devices supporting multiple ink levels, whereby the full tonal range of a colorant is divided into a number of segments equal to the number of ink levels supported. The tone value to be rendered in the area of an output pixel is normalised to a range of 0 to 1 within the segment in which that tone value falls, and the same threshold array is used to determine whether the pixel should be marked in the ink level for that segment, or the ink level for the next lower segment.

A further example of tile-based screens is another extension to the threshold array model for devices supporting multiple ink levels, whereby a sequence of threshold arrays are provided. If the tone value to be rendered in the area of an output pixel is higher than that of the table value associated with the position of that pixel on the output in the first array then the pixel is marked with the first ink level. Otherwise, if the tone value to be rendered in the area of an output pixel is higher than that of the table value associated with the position of that pixel on the output in the second array then the pixel is marked with the second ink level. If the tone value is still lower than that in the threshold array the third and subsequent threshold arrays are examined. If the tone value is lower than that in the last array of the sequence, then the pixel is not marked.

Yet another example of tile-based screens provides a multi-level non-sequential halftoning process whereby a number of lookup arrays of values are provided, where the number of arrays is equal to the number of gray levels to which tone values to be rendered are quantised. This may, for example, be 256 or 1024, being $2^8$ and $2^{10}$ respectively. Each array is tessellated across the rendered output in the same way as threshold arrays are. The tone value to be rendered is quantised to a range of values matching the number of lookup arrays, and the lookup array associated with that value is selected. As an example, if there are 256 lookup arrays, using indexes of 0 to 255, and the tone value to be rendered is 23%, the 23% would be multiplied by 255 and then converted to an integer (e.g. by rounding): round (0.23*255), resulting in 61. The $61^{st}$ lookup array is then selected and the table value associated with the position of the pixel on the output is selected. The value of that table entry directly or indirectly specifies the ink level to be marked on that pixel.

Another example of a tile-based screen includes a procedure where, for a given pixel (or other region) in the output raster being produced the position of that pixel relative to the halftone origin is determined and therefore the position of a tile repeat that covers that pixel is calculated. The location of that pixel relative to the relevant tile repeat allows a specific tile cell to be selected from the tile. The colorant level set by the graphical element(s) that mark that output pixel is then used to read a value for the dot placement to be produced from the tile cell. In at least some embodiments, the tile dot placement for different colorant values is predefined and stored in memory, in a look-up table, or in any other suitable form. In some embodiments, the dot placement may be dynamically generated, when a new colorant level is required; otherwise previously generated dot placements are stored or otherwise available.

Figure 3:
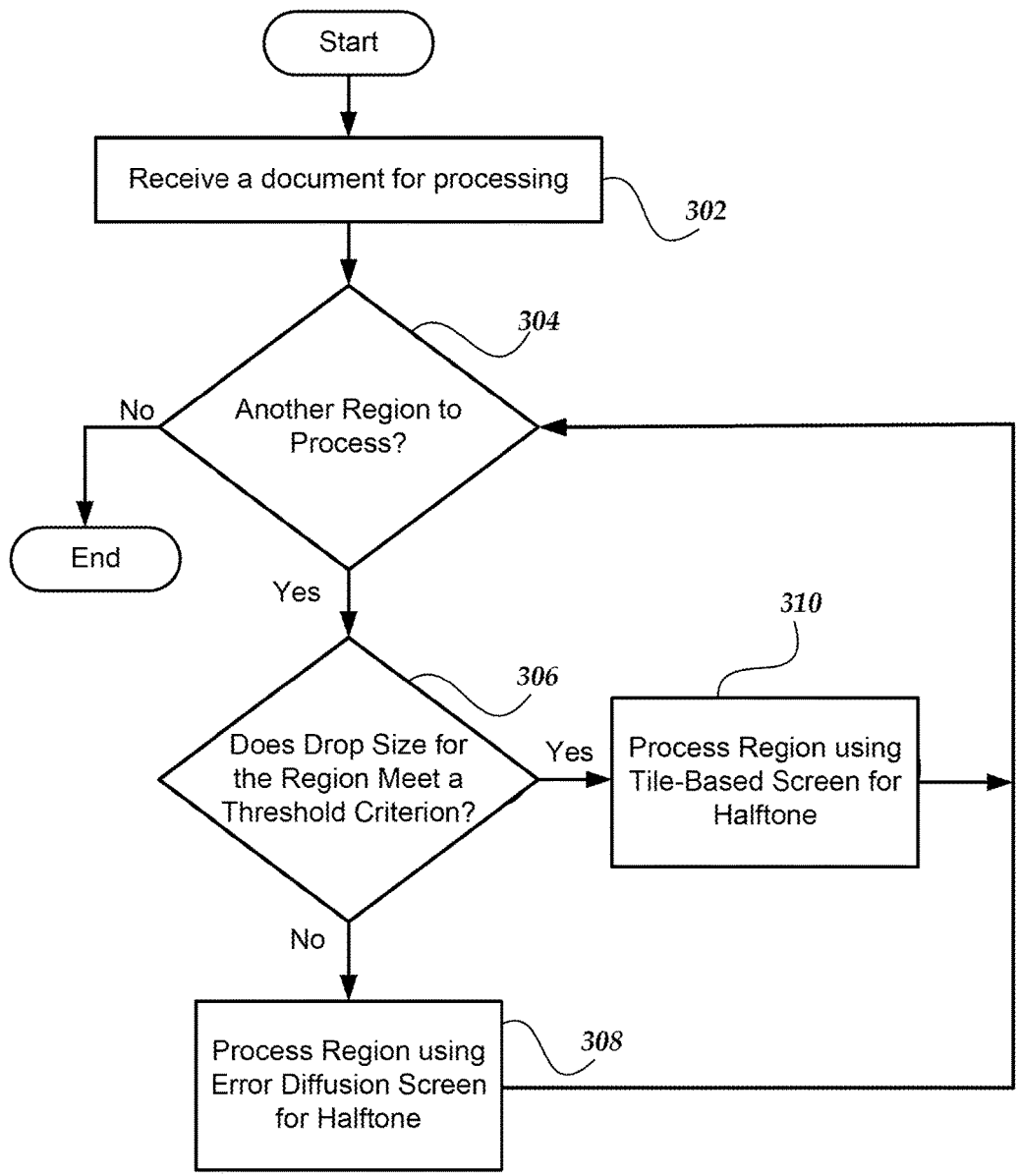
FIG. 3 is a schematic flowchart of another embodiment of a method of processing a document, according to the invention.

FIG. 3 illustrates one embodiment of a method of processing a document. In step 302, the document is received. In step 304, an inquiry is made whether there is another region (e.g., a pixel or other defined region) of the document to be processed. If all regions are processed, then the method is complete. If there is another region to process, in step 306, the drop size for that region is determined and an inquiry is made whether the drop size meets a threshold criterion. For example, the threshold criterion may be that the drop size is above (or, alternatively, at or above) a threshold size. (It will be understood that alternative threshold criterion can be that the drop size is below, or at or below, a threshold size in which case the answers will be opposite to those illustrated in FIG. 3.) For example, the threshold level be any drop size other than the smallest drop size or may be any drop size other than the smallest two, three, four, or more drop sizes. It will be recognized that other threshold criteria can be selected. For example, the threshold criterion may only exclude the second smallest drop size (or some other specified drop size(s)), so that the smallest drop size or a larger drop size do meet the threshold criterion, but the second smallest drop size (or some other specified drop size(s)) does not meet the threshold criterion.

If the inquiry in step 306 is yes, the region is processed using an error diffusion screen, in step 308. If the inquiry in step 306 is no, the region is processed using a tile-based screen, in step 310. The method then returns to step 304.

As an example of the method illustrated in FIG. 3, on a press that requires multi-level spot functions there can be advantages in using error diffusion screens for one or more drop sizes, and tile-based screens for the rest. EDS creates smoother tones with the smallest drop sizes on at least some presses, but is slower than using tile-based solutions.

Figure 4:
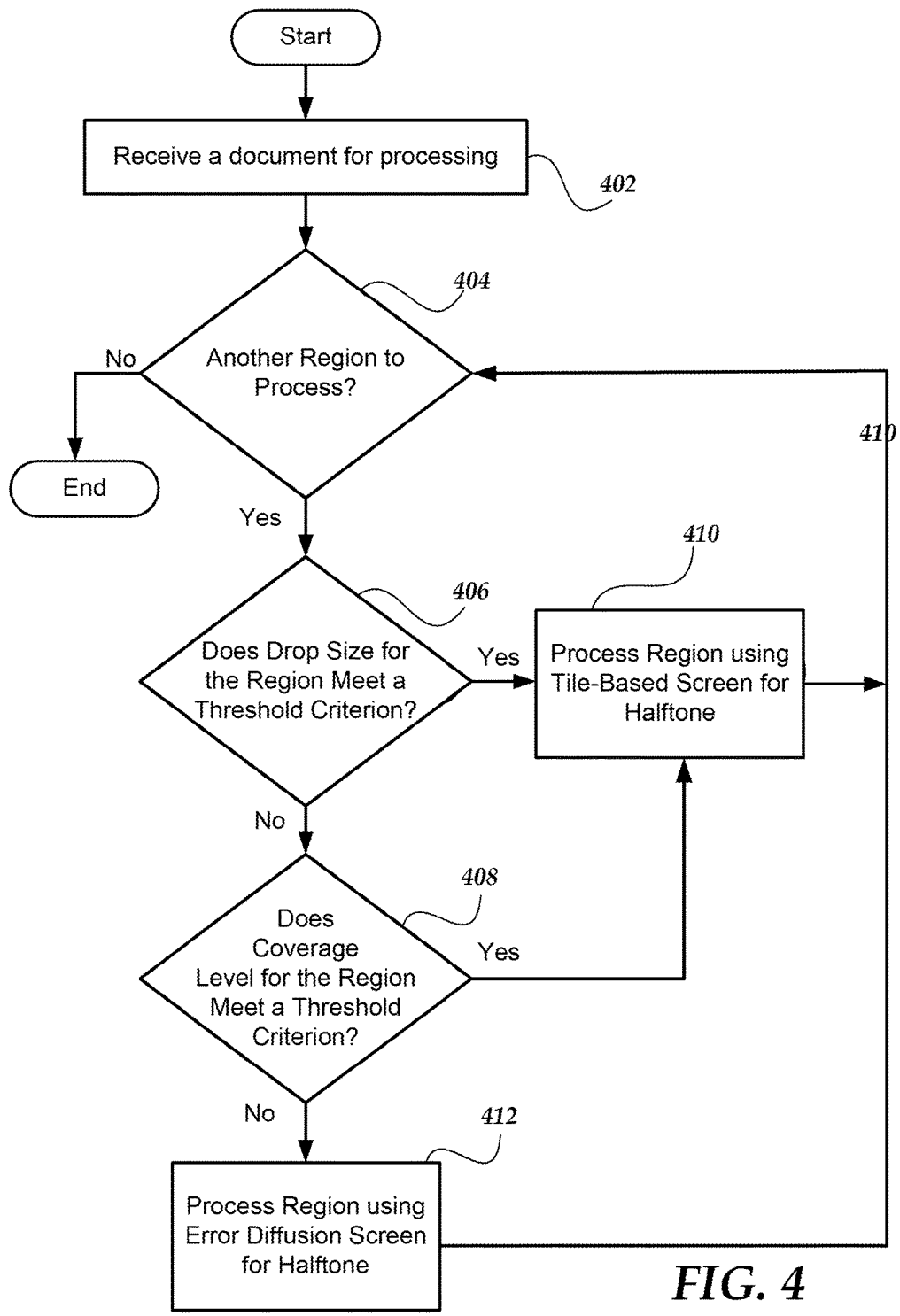
FIG. 4 is a schematic flowchart of a third embodiment of a method of processing a document, according to the invention.

FIG. 4 illustrates one embodiment of another method of processing a document. In step 402, the document is received. In step 404, an inquiry is made whether there is another region (e.g., a pixel or other defined region) of the document to be processed. If all regions are processed, then the method is complete. If there is another region to process, in step 406, the drop size for that region is determined and an inquiry is made whether the drop size meets a threshold criterion. For example, the threshold criterion may be that the drop size is above (or, alternatively, at or above) a threshold size. (It will be understood that alternative threshold criterion can be that the drop size is below, or at or below, a threshold size in which case the answers will be opposite to those illustrated in FIG. 4.) For example, the threshold level be any drop size other than the smallest drop size or may be any drop size other than the smallest two, three, four, or more drop sizes.

If the inquiry in step 406 is no, the region is processed using a tile-based screen, in step 410. If the inquiry in step 406 is yes, then an inquiry is made, step 408, whether the coverage level for that region meets a threshold criterion. For example, the threshold criterion may be that the coverage level is above (or, alternatively, at or above) a threshold coverage level. (It will be understood that alternative threshold criterion can be that the coverage level is below, or at or below, a threshold coverage level in which case the answers will be opposite to those illustrated in FIG. 4.)

If the inquiry in step 408 is no, the region is processed using a tile-based screen, in step 410. If the inquiry in step 408 is yes, the region is processed using an error diffusion screen, in step 412. The method then returns to step 404.

As an example of the method illustrated in FIG. 4, the lightest tones for the smallest drop size or sizes use EDS while the rest of the tones (as well as all tones for large drop sizes) are halftoned using tile-based screens. EDS can often produce smoother results at very low coverage than tile-based screens can.

Figure 5:
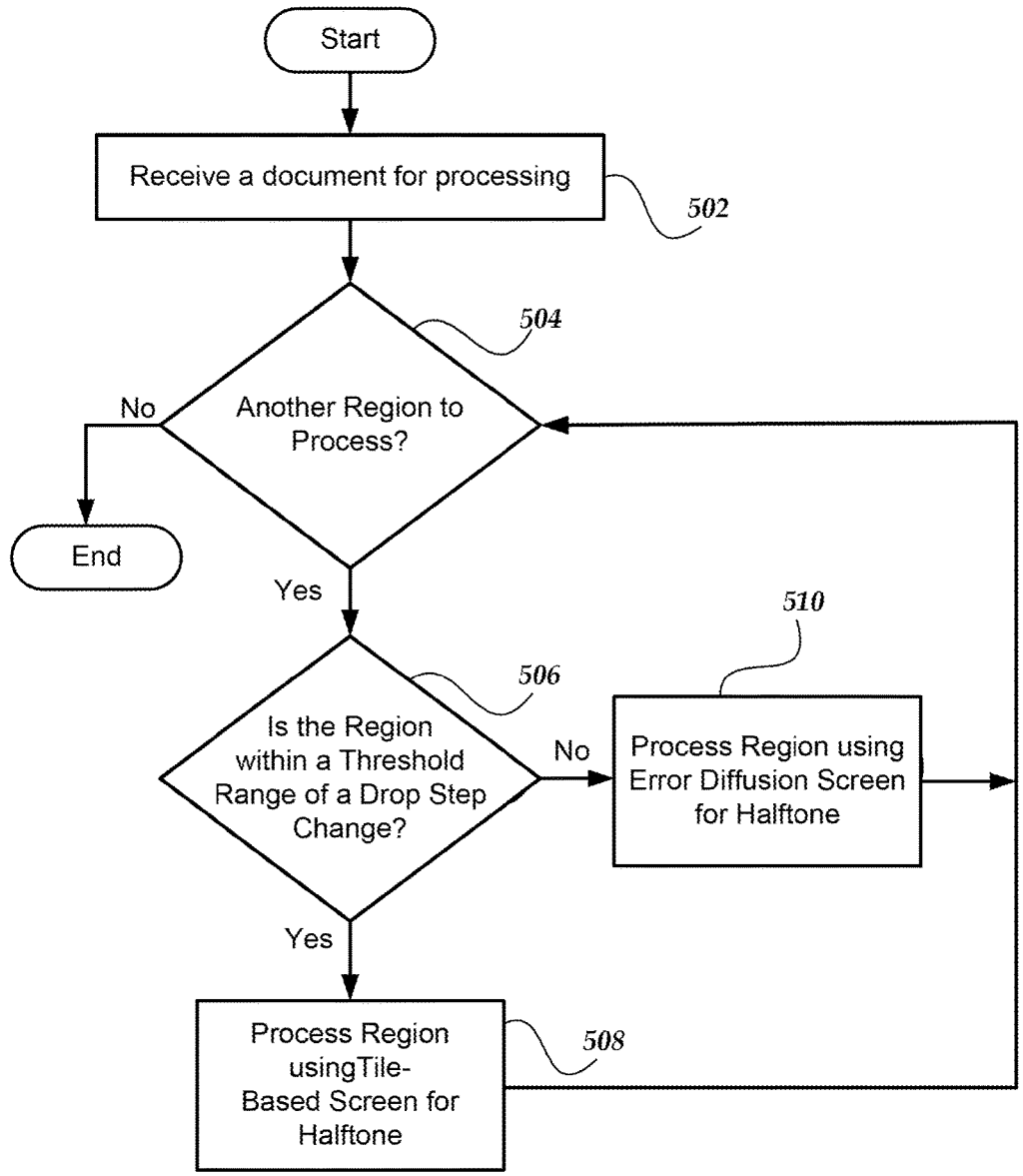
FIG. 5 is a schematic flowchart of a fourth embodiment of a method of processing a document, according to the invention.

FIG. 5 illustrates one embodiment of yet another method of processing a document. In step 502, the document is received. In step 504, an inquiry is made whether there is another region (e.g., a pixel or other defined region) of the document to be processed. If all regions are processed, then the method is complete. If there is another region to process, in step 506, an inquiry is made whether that region is near a drop step change. A drop step change refers to coverage levels (or sets of levels) where the colorant drop size to obtain those levels changes from one size to a larger or smaller size. Thus, the inquiry could be phrased as whether the region is within a threshold range of the drop step change where the threshold range is measured as a physical distance on the media or a number of pixels.

If the inquiry in step 506 is no, the region is processed using an error diffusion screen, in step 510. If the inquiry in step 506 is yes, the region is processed using a tile-based screen, in step 508. The method then returns to step 504.

As an example of this embodiment, it has been found that EDS can produce very smooth and high-quality renditions of some graphics, but tends to reduce or damage high-contrast detail, which can make barcodes and small text illegible. In such instances, using tile-based screens in areas around a step-change in the output values, and EDS elsewhere.

Similarly, the inquiry at step 506 can be changed to cover other instances where EDS leads to artefacts. For example, EDS can also suffer from "tear-away", where a light tone (most typically) below and to the right of a hard edge with a dark tone is painted lighter than it should be, leading to a halo effect. Thus, step 506 can be modified (or an additional inquiry step can be added) to inquire whether the region is a light tone that is below and to the right of a dark tone. If so, then a tile-based screen is used. If not, then EDS is used.

It will be understood that the methods illustrated in FIGS. 3-5 can be combined. For example, the inquiries 306, 506 can be combined sequentially to provide a method in which EDS is used for drop sizes at or below a threshold unless the coverage is near a drop step change. As another example, the inquiries 406, 408, and 506 can be combined to provide a method in which EDS is used for drop sizes at or below a threshold and coverages at or below a threshold unless the coverage is near a drop step change. In addition, the modified inquiry described in the preceding paragraph can also be combined with any of inquiries 306, 406, 408, or 506.

The examples provided above refer to a threshold criterion, but it will be recognized that in some embodiments there may be multiple threshold criteria and that use of the term "criterion" is also intended to include multiple "criteria" unless otherwise indicated.

The examples above are provided for inkjet digital printers and presses, but similar effects are seen using other printing technologies, such as electrophotography (toner). The examples are also presented using error diffusion and tile-based screens, but similar methods can also use other combinations, for example, combining EDS with spot screening functions or alternative algorithmic screening functions.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method of processing a document for printing; the method comprising:
   receiving a document;
   for each of a plurality of regions of the document,
      determining a drop size for printing the region, and
      determining whether the drop size for printing the region meets a first threshold criterion and, if so, processing the region using a tile-based screen for halftoning, otherwise determining whether a coverage level for printing the region meets a second threshold criterion and, if so, processing the region using a tile-based screen for halftoning and, if not, processing the region using an error diffusion screen for halftoning; and
   printing the processed regions.

2. The method of claim 1, wherein the first threshold criterion is that the drop size is not the smallest drop size.

3. The method of claim 1, wherein the second threshold criterion is that the coverage level is at or above a threshold coverage level.

4. The method of claim 1, wherein the tile-based screen is a threshold screen.

5. The method of claim 4, wherein the threshold screen utilizes at least one lookup array of threshold values.

6. The method of claim 1, wherein the first threshold criterion is that the drop size is not one of the smallest two drop sizes.

7. The method of claim 1, wherein the first threshold criterion is that the drop size is not one of the smallest three drop sizes.

8. The method of claim 1, wherein the first threshold criterion is that the drop size is not one of the smallest four drop sizes.

9. The method of claim 1, wherein the second threshold criterion is that the coverage level is above a threshold coverage level.

10. The method of claim 1, wherein the second threshold criterion is that the coverage level is at or below a threshold coverage level.

11. The method of claim 1, wherein the second threshold criterion is that the coverage level is below a threshold coverage level.

12. A system for processing a document for printing, the system comprising:
   at least one processor configured and arranged to perform the method of claim 1.

13. A non-transitory computer-readable medium having processor-executable instructions for processing documents, the processor-executable instructions when installed onto a device enable the device to perform the method of claim 1.

14. A method of processing a document for printing; the method comprising:
   receiving a document;
   for each of a plurality of regions of the document, determining whether the region is within a threshold range of a drop step change and, if so, processing the region using a tile-based screen for halftoning and, if not, processing the region using an error diffusion screen for halftoning, wherein the threshold range is a physical distance on media or a number of pixels; and
   printing the processed regions.

15. The method of claim 14, wherein the tile-based screen is a threshold screen.

16. The method of claim 14, wherein the threshold screen utilizes at least one lookup array of threshold values.

17. The method of claim 14, wherein the threshold range is the physical distance on the media.

18. The method of claim 14, wherein the threshold range is the number of pixels.

19. A system for processing a document for printing, the system comprising:
   at least one processor configured and arranged to perform the method of claim 14.

20. A non-transitory computer-readable medium having processor-executable instructions for processing documents, the processor-executable instructions when installed onto a device enable the device to perform the method of claim 14.

* * * * *